US009656850B2

(12) United States Patent
Busick et al.

(10) Patent No.: US 9,656,850 B2
(45) Date of Patent: May 23, 2017

(54) DEVICE AND METHOD FOR PREVENTING THE OVERFLOW OF A FLUID RESERVOIR

(71) Applicant: LVD Acquisition, LLC, Columbus, OH (US)

(72) Inventors: Louis Busick, Westerville, OH (US); Stephen Sabin, Ballina (IE); John Kennedy, Tubbercurry (IE)

(73) Assignee: LVD Acquisition, LLC, Columbus, OH (US)

( * ) Notice: Subject to any disclaimer, the term of this patent is extended or adjusted under 35 U.S.C. 154(b) by 409 days.

(21) Appl. No.: 14/484,831

(22) Filed: Sep. 12, 2014

(65) Prior Publication Data

US 2015/0068619 A1    Mar. 12, 2015

Related U.S. Application Data

(60) Provisional application No. 61/876,838, filed on Sep. 12, 2013.

(51) Int. Cl.
*B65B 1/04* (2006.01)
*B67D 3/00* (2006.01)
*F16K 31/22* (2006.01)
*F16K 24/04* (2006.01)

(52) U.S. Cl.
CPC .......... *B67D 3/0032* (2013.01); *F16K 24/042* (2013.01); *F16K 31/22* (2013.01); *B67D 3/0038* (2013.01); *Y10T 137/7436* (2015.04)

(58) Field of Classification Search
CPC ... B67D 3/0032; B67D 3/0038; F16K 24/042; Y10T 137/7436; Y10T 137/7433
See application file for complete search history.

(56) References Cited

U.S. PATENT DOCUMENTS

| 5,121,778 A | 6/1992 | Baker et al. |
| 5,273,083 A | 12/1993 | Burrows |
| 5,413,152 A | 5/1995 | Burrows |
| 6,167,921 B1 | 1/2001 | Busick et al. |
| 6,619,511 B2 | 9/2003 | Hydak et al. |
| 2016/0002022 A1* | 1/2016 | Orita .................... B67D 3/0009 222/94 |

* cited by examiner

*Primary Examiner* — Jason K Niesz
(74) *Attorney, Agent, or Firm* — Standley Law Group LLP

(57) ABSTRACT

A device for preventing the overflow of a fluid reservoir, having a first tubular body with a hole through the interior and exterior surfaces at one end, a second tubular body disposed within the first body such that a portion of the interior surface of the first body and the exterior surface of the second body define an air channel, and a floatation device. The position of the tubular bodies relative to one another determine whether air from a fluid reservoir may exit the reservoir via the hole in the end of the first body. The flotation device is connected to an end of the second body and floats in the fluid reservoir wherein movement of the second body relative to the first body is caused by a change in the water level, such that the air channel is opened or closed by the position of the floatation device.

20 Claims, 17 Drawing Sheets

DEVICE AND METHOD FOR PREVENTING THE OVERFLOW OF A FLUID RESERVOIR

CROSS-REFERENCE TO RELATED APPLICATIONS

This application claims priority to U.S. Provisional Application No. 61/876,838, filed Sep. 12, 2013, which is incorporated by reference in its entirety as if fully recited herein.

TECHNICAL FIELD

Exemplary embodiments relate to devices and methods for preventing a fluid reservoir from overflowing. A preferred exemplary embodiment of a device for preventing a fluid reservoir from overflowing is utilized in conjunction with a water cooler and prevents the cooler's water reservoir from overflowing in the event that the water bottle supplied to the cooler has a crack/other defect which permits for the entry of air into the bottle.

BACKGROUND AND SUMMARY OF THE INVENTION

In a typical bottled water cooler installation, a three or five gallon bottle of water is inverted onto the top of a water cooler. The bottle is installed such that the neck of the bottle is placed into the open top of the reservoir exposed on the top of the water cooler. Because the bottle is upside down, the water flows into the reservoir. During the filling of the reservoir, air is pulled up into the bottle to relieve the vacuum and permits water to escape from the bottle into the reservoir where it is maintained until consumption, utilization, etc. When the water level in the reservoir rises above the neck of the bottle, air is no longer able to enter the bottle and the resulting vacuum in the bottle prevents additional water from escaping. Water flow thereby stops and the reservoir does not overflow. The water bottles are typically made from a plastic material such as PET or polycarbonate. These bottles are often—and usually are—used over as many as ten times. In between uses, they are returned to the bottled water company, washed, sanitized, then refilled and returned to a bottled water customer. During this process of exchange, the bottles can be damaged due to handling, dropping, hot water cleaning, harsh chemicals, etc. Sometimes the damage is a small crack in the side or bottom of the bottle.

These cracks can be so small that very little or no water leaks from them. However, once the bottle cap is removed and the bottle is placed onto a cooler, the crack, which was previously under water, might now be above the water level. Air can enter the crack and prevent a vacuum from occurring. If this happens, water will continue to flow out of the inverted bottle and overflow the reservoir eventually flooding the area around the water cooler.

In the past, this problem has been handled by installing a device on top of the water cooler that seals to the bottle cap and the water cooler reservoir. Some of these devices, or components thereof, can be found in U.S. Pat. Nos. 5,413,152, 5,273,083, 6,619,511, 6,167,921 and 5,121,778 the entire disclosures of which are hereby incorporated herein by reference. The sealed system that these devices are used to create rely on a seal to the reservoir within the water cooler. Sealing to the reservoir can be a problem because of the large surface to be sealed. Specifically, the opening of the water reservoir is typically six inches in diameter. Surface finish irregularities, variability in reservoir shape due to manufacturing methods, irregularities in the seals from the molding process, damage to the seals and seal surfaces during cooler reconditioning and cleaning, and cracking or tearing because of long term stress of being stretched as well as being pinched tightly also cause problems with the prior art systems. The device disclosed herein prevents leaks in water coolers and similar devices that utilize a fluid reservoir and eliminates the aforementioned problems of sealing to the reservoir by isolating the sealing area to a probe that engages with the water bottle. Preferably, the seal forms between the probe and the cap of the water bottle. In a preferred exemplary embodiment, a first tubular body (i.e. a probe) is adapted to be received by and form an air tight seal with a container that selectively maintains a volume of fluid said first tubular body comprising an interior surface and an exterior surface said interior surface defining a hollow within the first tubular body. The first tubular body may further comprise a first end and a second end wherein the first end of the first tubular body defines a first hole extending from the interior surface to the exterior surface of the first tubular body to permit for the passage of an air flow and further defines a second hole extending from the interior surface to the exterior surface of the first tubular body to permit for the passage of a flow of fluid that is received from the container. The exemplary embodiment may further comprise a second tubular body (i.e. a flow tube) that comprises an interior surface and an exterior surface said interior surface defining a hollow within the second tubular body. The said second tubular body may further comprise a first end and a second end wherein the first end of the second tubular body is received by the first tubular body and movably disposed therein and the second end of the second tubular body may be disposed within the fluid reservoir. The hollow defined by the interior surface of the second tubular body may receive the flow of fluid after it is received by the second hole of the first tubular body and may direct the fluid flow to the fluid reservoir. At least part of the exterior surface of the second tubular body and at least part of the interior surface of the first tubular body preferably define an air channel for a flow of air to travel from within the fluid reservoir to the first hole defined by the first tubular body where the air flow may exit the device and gain access to the container. The preferred exemplary embodiment may further comprise a floatation device, such as an air bell, that is connected to the second end of the second tubular body such that it may be disposed within the fluid reservoir. The floatation device is preferably capable of floating on top of the fluid in the fluid reservoir such that when the fluid within the reservoir rises above a critical level, the floatation device will rise and cause a corresponding movement of the second tubular body within the first tubular body. In the preferred embodiment, when the second tubular body moves within the first tubular body as described, the air channel eventually becomes closed when the second tubular body has reached a predetermined position within the first tubular body (the "maximum height"). In some embodiments, when the second tubular body is at the maximum height, at least part of the first end of the second tubular body blocks and effectively closes the second hole of the first tubular body. Preferably, when this occurs, no water may travel to the reservoir via the device preventing overflow of the reservoir that might otherwise occur if a crack in the water bottle permits for air to enter the bottle. The floatation device may comprise an inner tube that maintains a volume of air and which is capable of floating on water in some embodiments.

Under normal conditions (i.e. there is no crack, etc. in the bottle which houses the fluid), fluid will flow from the bottle, through the device, and into the reservoir only until the fluid level rises to a height where the fluid blocks air within the reservoir from reaching the air channel of the device, creating a vacuum. The vacuum exists until fluid is drawn from the reservoir bringing the level of the fluid below the air channel which permits for a flow of air to leave the reservoir and for a flow of water to correspondingly enter the reservoir via the device until the fluid again rises to a level that blocks the air channel. No movement of the floatation device will occur during this process. However, if a crack or other defect exists in the water bottle that admits air, water may enter the device via the second hole of the first tubular body and the first hole of the first tubular body and travel to the reservoir via the air channel and the hollow defined by the interior of the second tubular body even after the water level has risen to a height where it blocks air in the reservoir from accessing the air channel. When this occurs, the rising water will reach a critical level and cause movement of the floatation device which triggers a corresponding movement of the second tubular body within the first tubular body closing off the air channel as well as the second hole of the first tubular body preventing additional water from entering the reservoir via the device when the second tubular body reaches the maximum height.

Some exemplary embodiments may also comprise a seal connected to the first end of the second tubular body. The seal preferably assists in closing off the air channel existing between the exterior surface of the second tubular body and the interior surface of the first tubular body as well as assists in effectively closing off the second hole of the first tubular body. As discussed, this preferably occurs when the second tubular body has reached the maximum height in the first tubular body. In some exemplary embodiments, the seal comprises lips that engage at least part of the interior surface of the first tubular body when the movement of the floatation device has caused the second tubular body to move within the first tubular body to a maximum height.

In some exemplary embodiments, the exterior surface of the first tubular body comprises a probe cup that is adapted to receive and maintain the container that selectively maintains a volume of fluid (such as a water bottle). In such exemplary embodiments, the air tight seal between the first tubular body and the container may be formed where the cup receives the container. The cup may be positioned at the second end of the first tubular body. The device may further comprise a probe cup retainer which connects to the reservoir and the probe cup assisting in holding the device in place on the cooler, etc. A funnel which connects to the probe cup may be utilized to assist in directing and properly positioning the bottle about the probe.

BRIEF DESCRIPTION OF THE DRAWINGS

Novel features and advantages of the present invention, in addition to those mentioned above, will become apparent to those skilled in the art from a reading of the following detailed description in conjunction with the accompanying drawings wherein identical characters refer to identical parts and in which.

DETAILED DESCRIPTION

Figure 1:
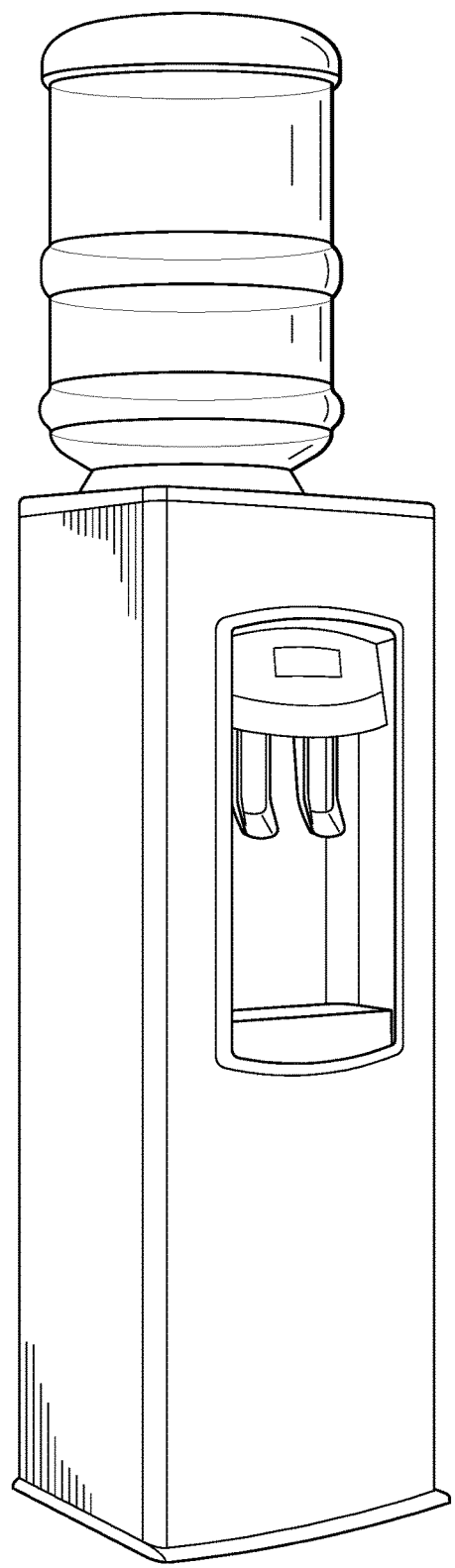
FIG. 1 shows an exemplary top-loaded cooler which may be used in conjunction with a device for preventing the overflow of a fluid reservoir.

Water coolers of both the top-loaded (such as is shown in FIG. 1) and the bottom-loaded variety utilize a large water bottle as a water source. When the water bottle is initially inserted into the cooler, water is able to flow from the bottle into the cooler where it is received by a water reservoir. The water flows from the bottle into the reservoir until the water level within the reservoir has reached a height that is sufficient to prevent air from flowing into the water bottle. This creates a vacuum within the water bottle that should exist until the water level within the reservoir later decreases below the critical level (because for example someone has drawn water from the reservoir to drink, etc.) causing additional water to be drawn from the bottle into the reservoir. Unfortunately, a water cooler may from time to time be equipped with a cracked water bottle. Though the crack may be so small that little to no water is able to leak through, when the water level within the bottle falls below the crack, air may be able to enter the water bottle destroying the vacuum that should exist and prevent the bottle from overfilling the cooler's reservoir.

Figure 2:
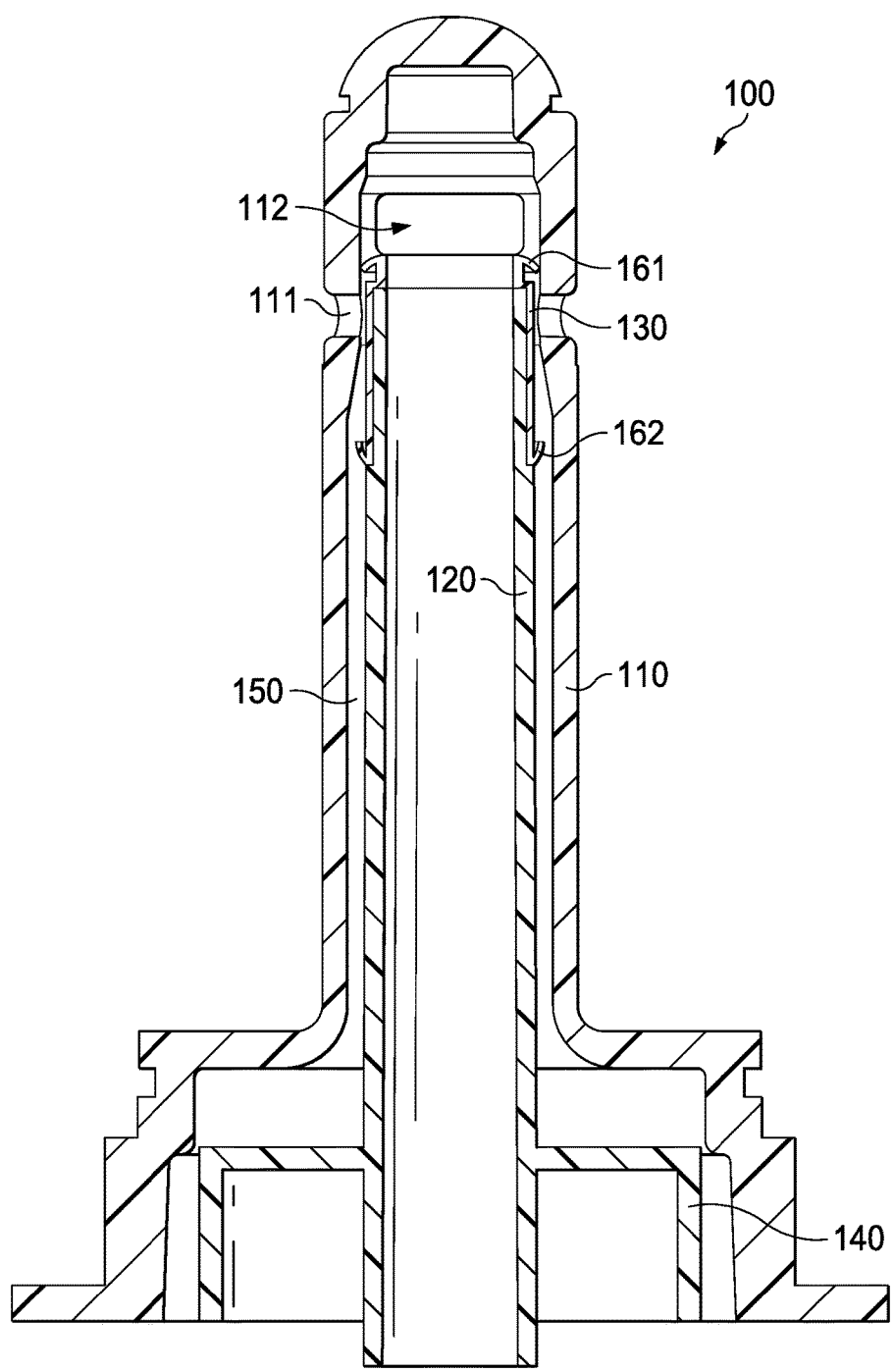
FIG. 2 shows a front section view of a first exemplary device for preventing the overflow of a fluid reservoir comprising a first tubular body, a second tubular body, an air bell, and seal wherein said device is shown in an open position.

An exemplary device for preventing the overflow of a fluid reservoir 100, as is shown in FIG. 2, may be utilized to prevent a cracked water bottle from overfilling a water reservoir within a water cooler. The exemplary device for preventing the overflow of a fluid reservoir 100 shown in FIG. 2 comprises a first tubular body 110 that is adapted to be received by and form an air tight seal with a container that selectively maintains a volume of fluid (such as a water bottle). The first tubular body 110 as shown may comprise an interior and an exterior surface where said interior surface defines a hollow within the first tubular body 110. The first tubular body preferably comprises a first end and a second end where the first end of the first tubular body 110 is to be received by and admitted into the interior of the container which selectively maintains the fluid. As shown, the first end of the first tubular body 110 preferably defines a first opening 111 for permitting a flow of air to exit the first tubular body 110 and enter the container and further defines a second opening 112 for permitting a flow of fluid to be received by the first tubular body 110 from the container. The second end of the first tubular body 110 preferably remains on the exterior of the container. The first hole 111 of the first tubular body 110 may comprise an upper edge and a lower edge, the upper edge being the edge of the hole closest to the first end of the first tubular body 110 and the lower edge being the edge that is farthest away from the first end of the first tubular body 110. Though the first hole 111 permits for a flow of air to exit the device 100 under normal circumstances, it may under some circumstances (for example when there is a crack in the bottle), also permit for fluid to enter the device 100 and gain access to the reservoir.

Figure 10:
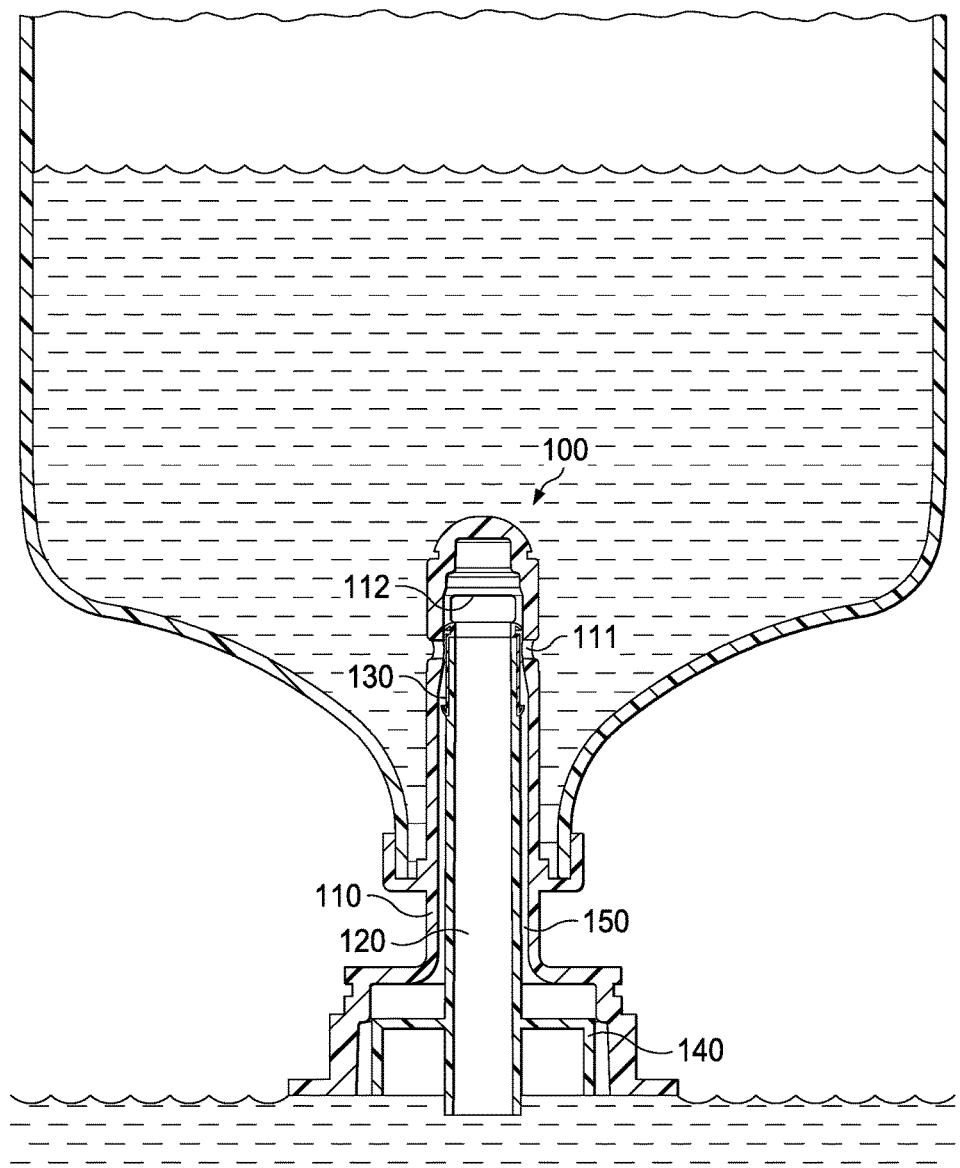
FIG. 10 shows a front section view of the exemplary device shown in FIG. 2 wherein said device is shown being received by a water bottle.
Figure 11A:
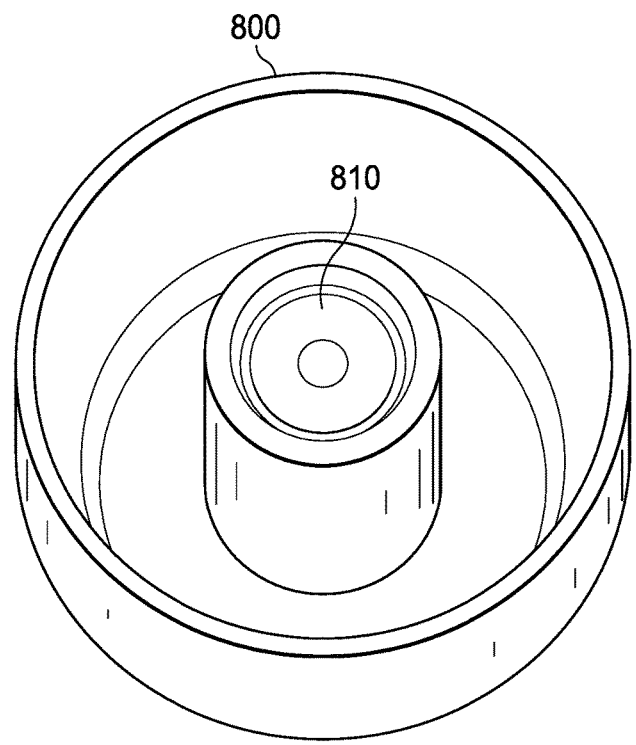
FIG. 11A shows a top perspective view of an exemplary cap that may be utilized by a water bottle, etc. in conjunction with an exemplary device for preventing the overflow of a fluid reservoir wherein said cap comprises a plug.
Figure 11B:
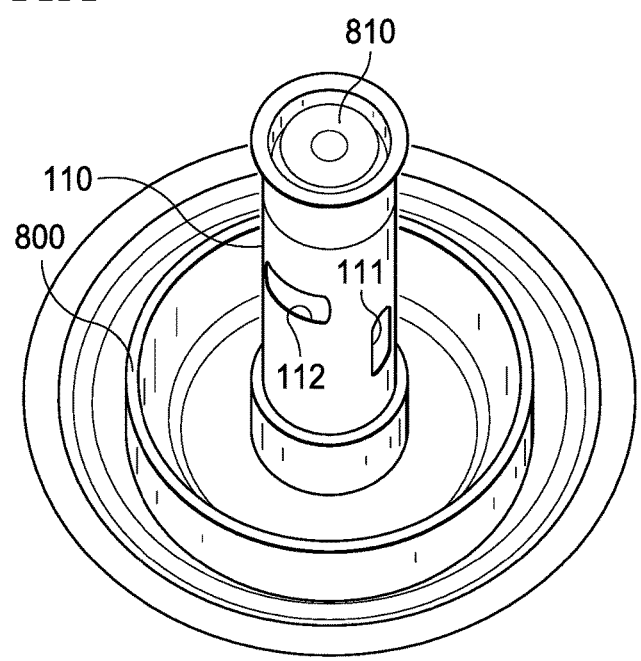
FIG. 11B shows a top perspective view of the exemplary cap as shown in FIG. 11A receiving an exemplary device for preventing the overflow of a fluid reservoir.

In preferred exemplary embodiments, the first tubular body 110 may be inserted into the cap of a water bottle. An exemplary cap that may be used in conjunction with a device 100 for preventing the overflow of a reservoir is shown in FIG. 11A. As shown, the cap 800 may comprise a plug 810 which prevents water (or other fluid) from escaping the bottle until it has been inserted into a cooler and placed about the device 100. In an embodiment where the device 100 seals with the cap 800, a first end of the first tubular body 110 may extend through the cap 800 and into the water/other fluid housed therein while a second end of the first tubular body 110 remains on the exterior side of the bottle. In preferred exemplary embodiments, the first tubular body 110 is received by the bottle cap 800 such that there is an air tight seal formed between the cap 800 and the portion of the first tubular body 110 which touches the cap. Such an embodiment is depicted in FIG. 11B wherein the bottle is not shown to more clearly show how the cap 800 and device 100 may engage to form an air tight seal. The exemplary device 100 shown in FIG. 2 further comprises a second tubular body 120 which comprises an interior and an exterior surface. The second tubular body 120 further comprises a first end and a second end wherein the first end of the second tubular body 120 is received by the hollow interior of the first tubular body 110 and is movably disposed therein. The second end of the second tubular body 120 is preferably disposed (or capable of being disposed) within the fluid reservoir. The interior surface of the second tubular body 120 defines a hollow for directing the flow of water received from the container via the second opening/hole 112 of the first tubular body 110 to the fluid reservoir. Thus, the hollow of the second tubular body provides a fluid passageway for fluid from the bottle/container to gain access to the reservoir in preferred embodiments. In some exemplary embodiments, the second tubular body 120 may connect to another tubular body which completes transfer of the fluid to the fluid reservoir. In preferred exemplary embodiments, at least part of the exterior surface of the second tubular body 120 and at least part of the interior surface of the first tubular body 110 define a channel 150 that exists between the two surfaces and which permits for the flow of air to travel from within the fluid reservoir to the first hole 111 defined by the first tubular body 110 where the air may exit the device 100 and may gain access to the container. Under normal conditions, the air channel 150 provides a means for air to exit the fluid reservoir and enter the bottle. As discussed above however, when there is a crack, etc. in the bottle which permits for air to enter the bottle and destroy the vacuum that would otherwise exist when the fluid level in the reservoir has risen to a height at which it blocks air within the reservoir from accessing the air channel 150, fluid within the bottle may be able to enter the first 111 and second 112 holes of the first tubular body and utilize both the hollow defined by the interior of the second tubular body as well as the air channel 150 to gain access to the fluid reservoir. FIG. 10 illustrates an exemplary device 100 being used under normal circumstances where the fluid in the reservoir has risen to a height where it blocks air in the reservoir from accessing air channel 150. In some exemplary embodiments, the first tubular body 110 is preferably stationary (relative to the fluid reservoir) as it may be affixed to part of the reservoir, water cooler, etc. Some exemplary embodiments of the device 100 may be utilized in conjunction with certain bottom loaded coolers wherein the bottle is inverted into a small reservoir positioned at the bottom of the cooler. The device 100 may be connected to the bottle by inserting the first tubular body 110 into a cap of the water bottle such that an air tight seal forms between the body 110 and the cap. Fluid may then flow out of the bottle, through the device 100 and into the reservoir until the fluid level in the reservoir rises to a height at which it blocks air within the reservoir from accessing the air channel 150 of the device 100 creating a vacuum (under normal circumstances i.e. no crack, etc. in the bottle). A water pump within the cooler may then pump water from the lower reservoir to a second, higher reservoir which is located near the top of the water cooler. A level indicator in the second reservoir turns the water pump on and off as needed.

Figure 3:
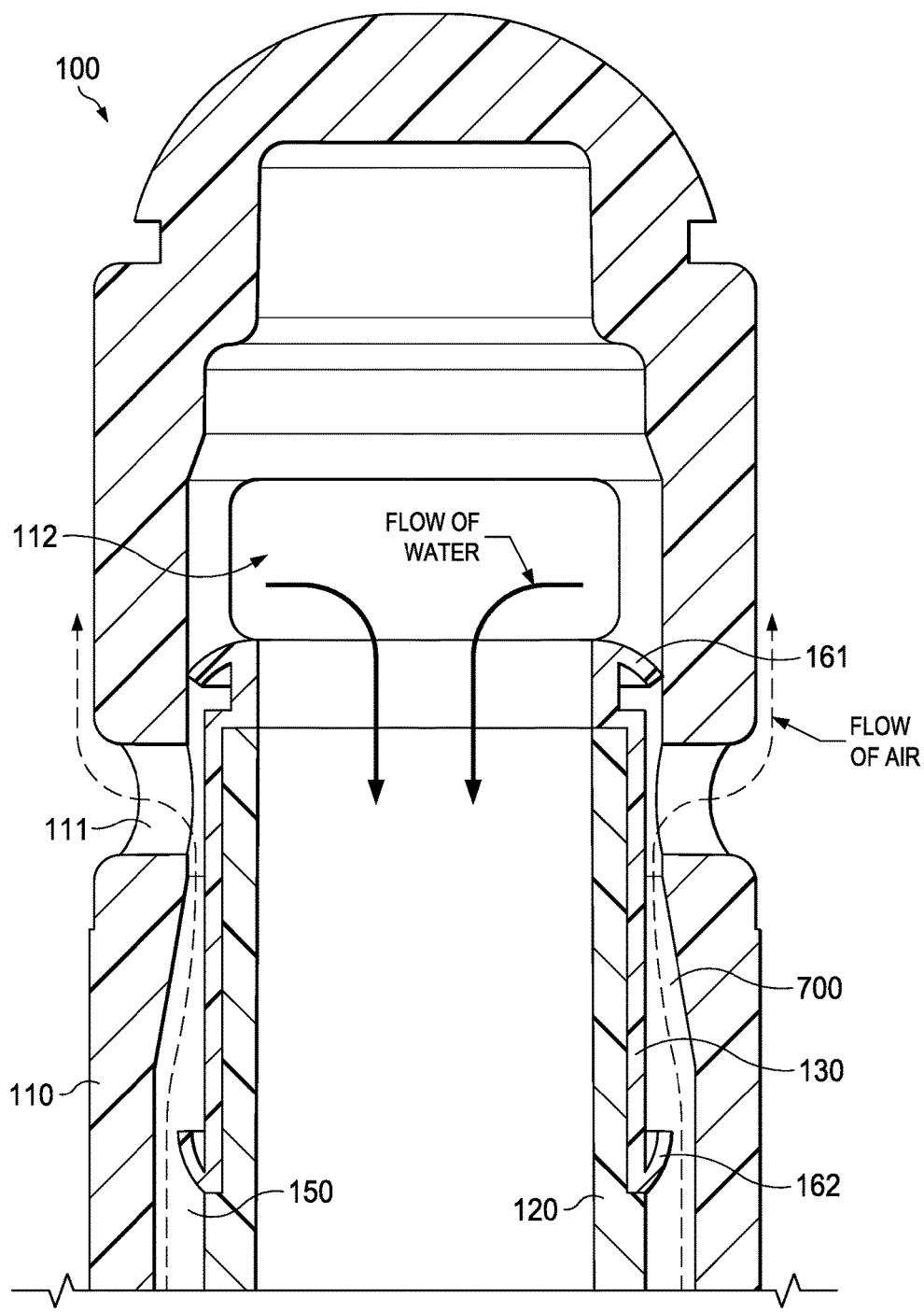
FIG. 3 shows a detailed front section view of the device for preventing the overflow of a fluid reservoir that is shown in FIG. 2 wherein arrows are utilized to show the flow of fluid and air through the device when the device is in an open position.

FIG. 3 uses a first set of arrows to illustrate how a flow of fluid may be received by a first tubular body 110 and second tubular body 120 via opening 112 and a second set of arrows to illustrate how a flow of air may travel from within the fluid reservoir through the channel 150 within the device 100 to opening 111 where the air may then enter the container. The position illustrated in FIGS. 2, 3, and 10 may be referred to as an open position of the device 100 because it permits water/fluid to flow from the container, through the device 100, and ultimately into the fluid reservoir. The flow of air and fluid through the device 100 as depicted in FIG. 3 is that which would occur under normal circumstances when the fluid in the reservoir has not reached a height such that it prevents air within the reservoir from gaining access to the air channel.

In the exemplary embodiment shown in FIGS. 2, 3, 4, 5, 10, and 12 the second tubular body 120 is moveably disposed within the first tubular body 110. As shown, the second tubular body 120 is connected to a floatation device 140 (in this embodiment an air bell) where said floatation device 140 is adapted to come into contact with and float on top of water/fluid that has been received by the reservoir. As shown in FIG. 2, the air bell 140 may be positioned at or near the second end of the second tubular body 120. When the fluid level within the reservoir reaches a critical height, air trapped by the air bell 140 preferably causes the air bell 140 to rise with the fluid level. In preferred exemplary embodiments, the critical height of the fluid in the reservoir at which the floatation device 140 will begin to move with the rising fluid is a height just slightly above the fluid height that is needed to keep air in the reservoir from accessing the air channel 150. In other words, the fluid in the reservoir will only reach the critical height under abnormal circumstances when a crack, etc. in the bottle is admitting air that in turn permits for water to flow out of the bottle, through device 100 and into the reservoir despite the fluid in the reservoir being high enough to block air in the reservoir from accessing the air channel. In preferred embodiments, when the floatation device begins to rise with the rising fluid in the reservoir, it causes the second tubular body 120 which is connected to the floatation device 140 to rise/change position within the first tubular body 110. When the second tubular body 120 has moved to a predetermined position within the first tubular body 110, said position being referred to as the "maximum height" of the second tubular body, the air channel 150 and the second opening 112 of the device 100 will be closed. This will prevent any additional water from flowing through the device 100 (via the hollow within the second tubular body 120 and the air channel 150) and gaining access to the reservoir. As discussed, the device that is able to float on top of the fluid within the fluid reservoir may be an air bell 140, but it will be appreciated by those of ordinary skill in the art that a variety of devices capable of floating on the fluid within the reservoir could be utilized to move the second tubular body relative to the first tubular body such as an inner tube, a floatable foam ring, etc. Because many embodiments of the device 100 will be utilized in conjunction with fluids that will ultimately be consumed as beverages, it may be preferable that the floatation device be made from a non-porous polymeric material which will be more resistant to the growth of bacteria.

Figure 9:
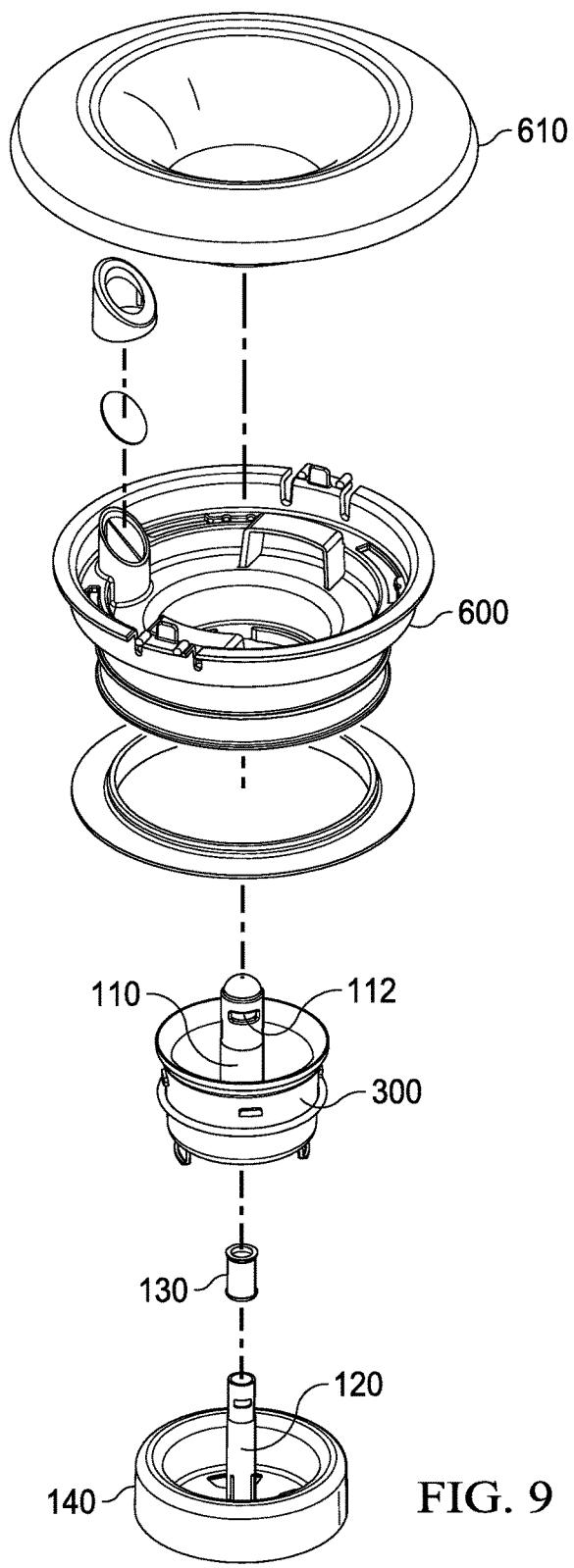
FIG. 9 shows an exploded perspective view of an exemplary device for preventing the overflow of a fluid reservoir that comprises a funnel, a probe cup retainer, probe, probe cup, flow tube seal, flow tube, and air bell.

In some exemplary embodiments, the air channel 150 may become closed and thus prevent the flow of water through the device 100 when a seal 130 on the first end of the second tubular body 120 becomes engaged with the interior surface of the first tubular body 110. This may, and preferably does occur, after the fluid in the fluid reservoir has reached a critical level causing a rise of the floatation device to trigger movement of the second tubular body 120 relative to the first tubular body 110. The seal 130 may comprise an upper lip 161 and a lower lip 162 that each rise into position as the second tubular body 120 is moved inside the first tubular body 110 so that the lips 161 and 162 are blocking the flow of water. Preferably, the seal lips 161 and 162 are shaped such that the pressure of the water assists in pushing the lips 161 and 162 outward into place and preventing water from flowing out of the water bottle. FIG. 9 clearly illustrates a device 100 comprising an upper lip 161 and lower lip 162 having such a shape. To aid in the sealing, the inner diameter of the first tubular body 110 can be stepped inward at the appropriate location to fit tighter onto the seal 130/lower lip 162. An exemplary step 700 of the interior surface of the first tubular body 110 can be seen clearly in FIGS. 3 and 5. In such an embodiment, the degree to which the inner diameter of the first tubular body 110 is stepped inward will correspond to the width of the seal 130/lower lip 162 so that the interior surface of the first tubular body 110 and the lower lip 162 of seal 130 become engaged when the second tubular body 120 has risen to the maximum height within the first tubular body thereby blocking any water that might otherwise travel from the bottle through the device 100 to the reservoir. In the FIG. 2 embodiment, opening 112 has been positioned on the first tubular body 110 such that it is blocked/closed by the first end of the second tubular body 120 (specifically by the upper lip 160 on the seal 130 on the first end of the second tubular body 120) when the second tubular body 120 is at the maximum height within the first tubular body 110. In some exemplary embodiments, such as shown in FIGS. 4 and 5, when opening 112 is blocked/closed by the seal 130 when the second tubular body 120 is at a maximum height within the first tubular body 110 water/fluid may be able to flow through the opening 120 but the upper lip 161 of the seal 130 prevents the water/fluid from reaching the interior/passageway of the second tubular body 120 and therefore cannot gain access to the reservoir.

As can also be seen in FIG. 2, the seal 130 may have a first end that is positioned at or near the first end of the second tubular body 120 where the width (or outer diameter) of the first end of the seal 130 is such that the exterior edge of the seal 130 (or alternatively the edge of upper lip 161 in some embodiments) extends to and is in contact with the interior surface of the first tubular body 110. The seal 130 (or lip 161) loosely seals to the inside of the first tubular body 110. This fit is a slide-able fit so that if the fluid level reaches a critical level within reservoir, the buoyancy force of the floatation device 140 can lift the second tubular body 120 and seal 130 without encountering much resistance from the seal 130. The ability of the second tubular body 120 to move in a downward motion relative to and within the first tubular body 110 is preferably limited such that the first end of the seal 130 that is in contact with and loosely sealed to the interior surface of the first tubular body 110 cannot move below a point within the probe 110 where it would be below an upper edge of opening 111. In such a configuration, the seal 130 directs water received from the bottle into the passage way of the second tubular body 120 and prevents the water flow from entering air channel 150 maintaining the space 150 for the flow of air exiting the reservoir.

Figure 4:
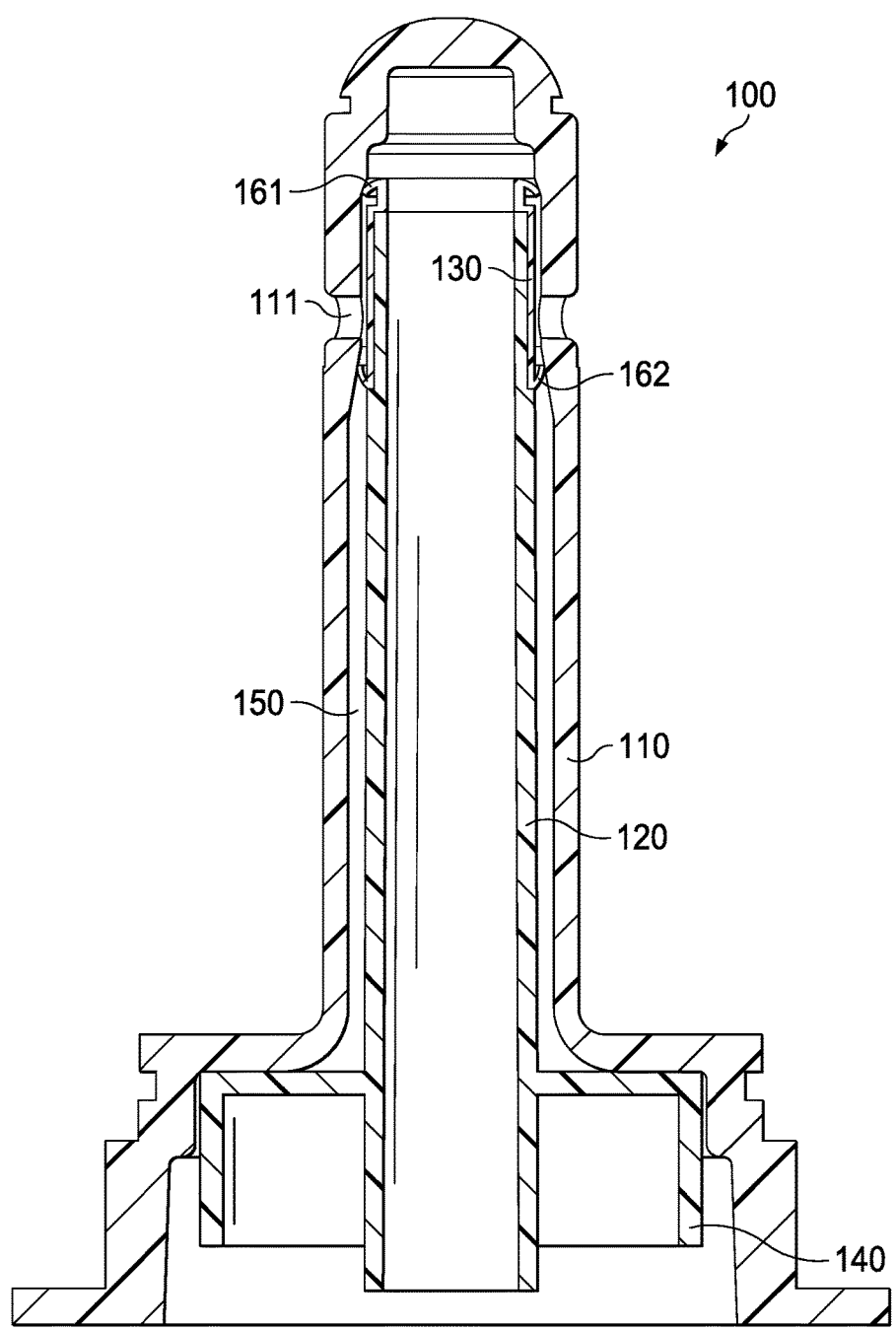
FIG. 4 shows a front section view of the exemplary device shown in FIG. 2 wherein said device is shown in a closed position meaning that no fluid can flow from the container and into the fluid reservoir.
Figure 5:
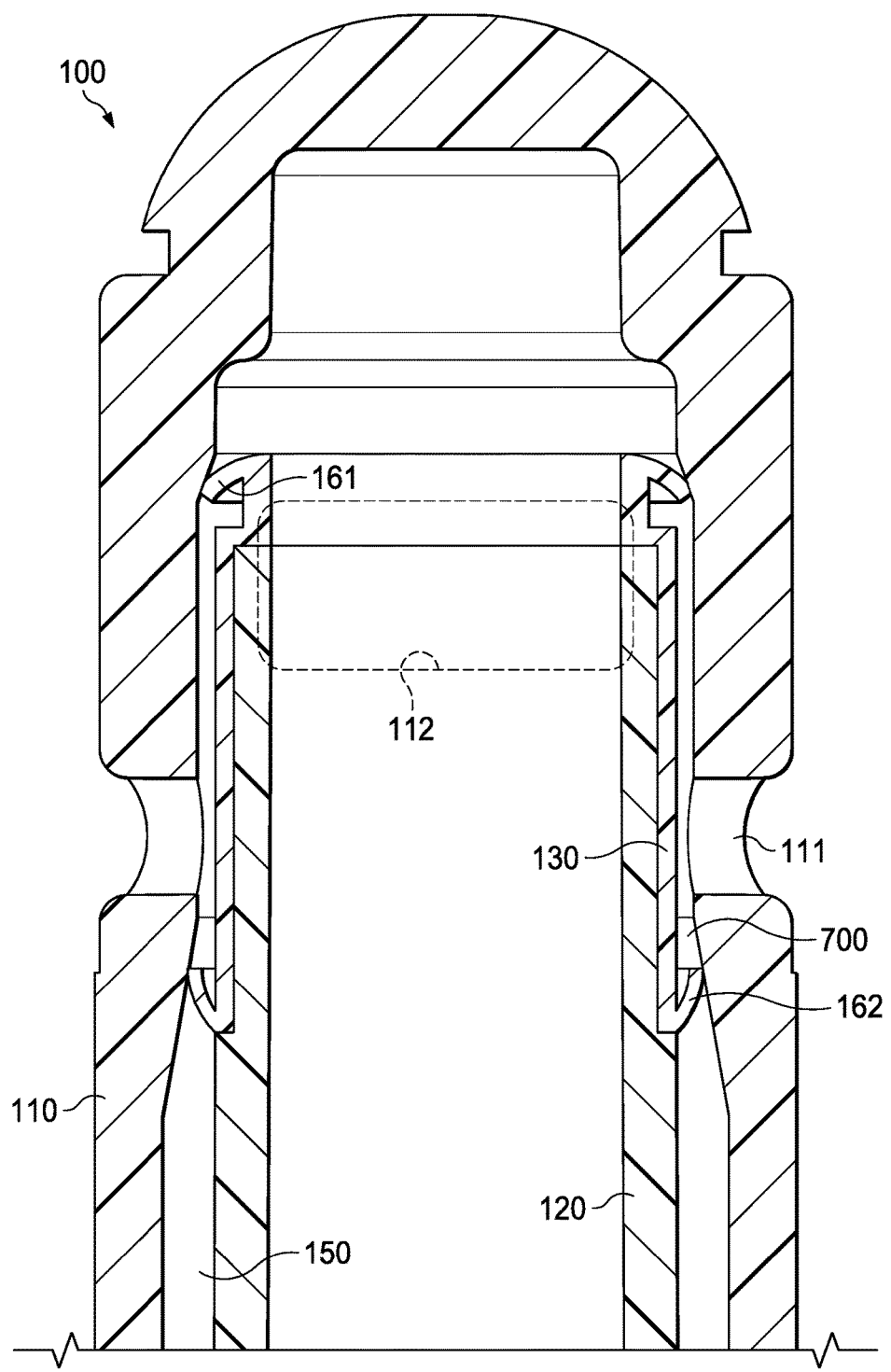
FIG. 5 shows a detailed front section view of the device for preventing the overflow of a fluid reservoir that is shown in FIG. 2 wherein said device is shown in a closed position.

FIG. 4 illustrates how the second tubular body 120 may move within the first tubular body 110 to a maximum height at which the interior surface of the first tubular body 110 engages lower lip 162 at a second end of the seal 130 thereby preventing any water that might otherwise travel from the bottle through opening 111 from entering into space/air channel 150 and at which the upper lip 161 of the seal 130 on the first end of the second tubular body 120 is blocking opening 112 preventing fluid within the container from reaching the fluid reservoir. This may be considered a closed position of the device 100 because when the second tubular body 120 has reached the maximum height within the first tubular body 110 no fluid may flow through the device 100 to the reservoir via either the hollow defined by the interior surface of the second tubular body 120 or the air channel 150. FIG. 5 shows a detailed front section view of the first end of the first tubular body 110 and the second tubular body 120 where the second tubular body 120 has reached a maximum height within the first tubular body 110 such that lower lip 162 on the second end of the seal 130 is engaged with the interior surface/step 700 of the first tubular body 110 and the first end of the second tubular body 120 (in conjunction with the upper lip 161 of seal 130 which surrounds the second tubular body 120) is blocking opening 112 from admitting water to the passageway defined by the interior of the second tubular body 120. When properly functioning, the exemplary device 100 shown in FIGS. 2, 3, 4, and 5 will remain in the open position, as is shown in FIGS. 2 and 3, unless the fluid level within the fluid reservoir (such as the fluid reservoir of a water cooler) rises too high and passes a critical level. When this happens, the air trapped in the floatation device 140 preferably lifts the second tubular body 120 causing the second tubular body 120 and seal 130 to be moved to the maximum height/a closed position within the first tubular body 110 as is shown in FIGS. 4 and 5.

In the exemplary embodiment of the device 100 that is shown in FIGS. 2, 3, 4, and 5, the seal 130 is a separate piece that is connected to and which encases the first end of the second tubular body 120. But it should be appreciated that in other exemplary embodiments, the seal 130 may be a feature of the second tubular body 120. In other words, the seal 130 does not have to be a separate piece but may be formed as part of and integral with the flow tube 120. In such an exemplary embodiment, the second tubular body 120 could comprise an exterior surface at least part of which would become engaged with at least part of the interior surface of the first tubular body 110 when the second tubular body reaches a maximum height within the first tubular body 110 thereby closing off the air channel 150 and (in preferred exemplary embodiments) also closing off opening 112. Similarly, though the exemplary embodiments discussed herein have generally comprised a seal 130 having an upper lip 161 and lower lip 162, it would be possible for an exemplary device 100 to have a seal 130 that does not comprise lip 161 and/or lip 162. In some exemplary embodiments, one or both of lips 161 and 162 may be replaced by lips or stepped out portions that are part of or connected to the interior surface of the first tubular body 110 that would engage with part of the exterior surface of the second tubular body 120 and/or with the seal 130 to close off the opening 112 and the air channel 150 such that no fluid could flow from the bottle through the device 100 to the reservoir when the second tubular body 120 reaches a maximum height within the first tubular body 110.

Figure 6A:
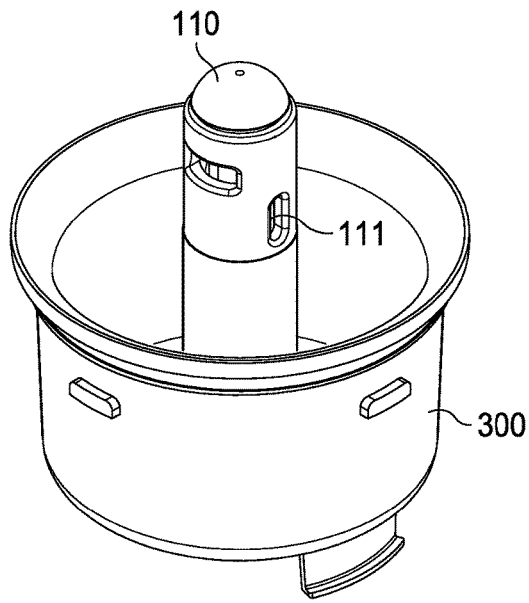
FIG. 6A shows a top perspective view of an exemplary first tubular body that may be used by a device for preventing the overflow of a fluid reservoir wherein the exterior surface of said first tubular body is shown comprising an exemplary cup.
Figure 6B:
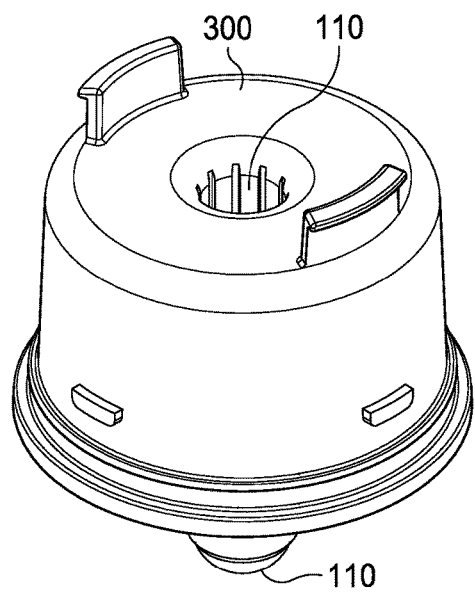
FIG. 6B shows a bottom perspective view of the exemplary first tubular body shown in FIG. 6A.
Figure 6C:
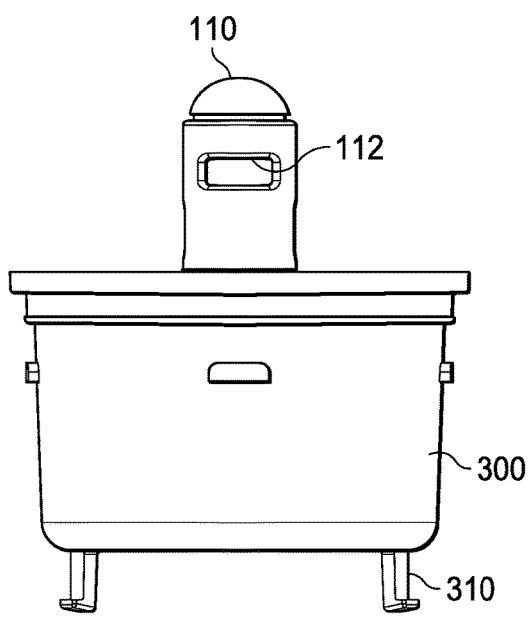
FIG. 6C shows a front plan view of the exemplary first tubular body shown in FIG. 6A.

In some exemplary embodiments, a device for preventing the overflow of a fluid reservoir 100 may further comprise a probe cup 300. An exemplary probe cup 300 that may be utilized by device 100 is shown in FIG. 6. The probe cup 300 is preferably connected to the second end of the first tubular body 110 and may assist in supporting and maintaining an airtight seal with a water bottle/other container which holds a volume of fluid. Specifically, in some exemplary embodiments, the container may be positioned into and supported by the probe cup 300. FIG. 6A illustrates a probe cup 300 that is capable of receiving and supporting a water bottle/similar container. The probe cup 300 may be considered part of the first tubular body 110 in some exemplary embodiments. Specifically, the probe cup 300 and first tubular body 110 may be a single, molded piece. In some exemplary embodiments where a device for preventing the overflow of a fluid reservoir comprises a probe cup 300, it may be possible to remove the cap from the water bottle/container before placing it into the cooler because the probe cup 300 is capable of forming an air tight seal with the inserted neck of the bottle and therefore there is no need for the first tubular body 110 to seal with the water bottle cap. As shown in FIG. 6B, the probe cup 300 may comprise at least one arm 310 that is designed to engage with the air bell 140 and to assist in preventing the air bell 140 from rising above a certain height/being dislocated by the fluid within the reservoir. In some exemplary embodiments, the first tubular body 110 may be affixed to the water cooler/device which houses the fluid reservoir via a probe cup 300 and probe cup retainer 600.

Figure 7A:
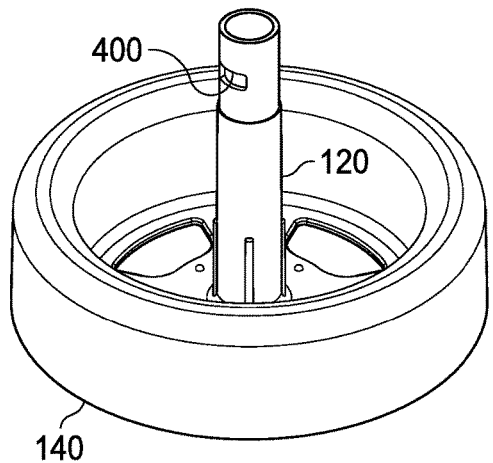
FIG. 7A shows a top perspective view of an exemplary second tubular body that may be used by a device for preventing the overflow of a fluid reservoir wherein said second tubular body is shown connected to an exemplary air bell.
Figure 7B:
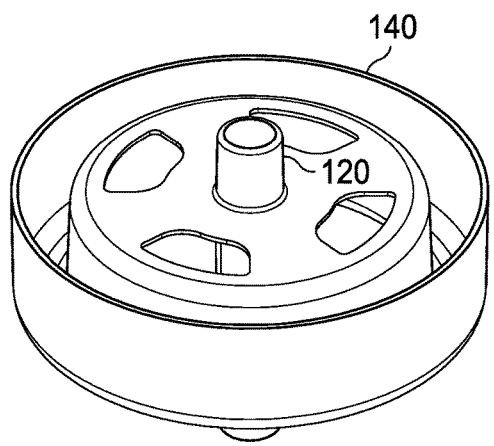
FIG. 7B shows a bottom perspective view of the second exemplary tubular body as shown in FIG. 7A.
Figure 7C:
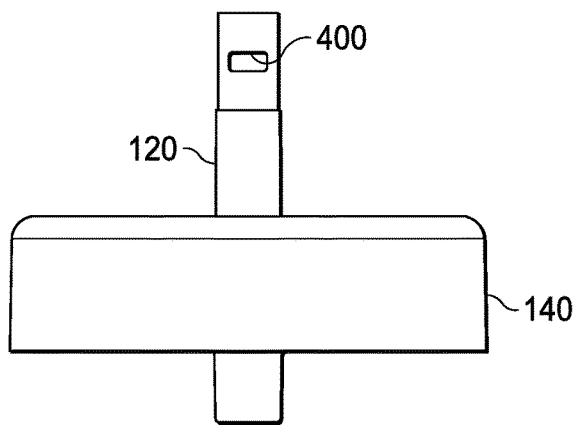
FIG. 7C shows a front plan view of the second exemplary tubular body as shown in FIG. 7A.
Figure 8A:
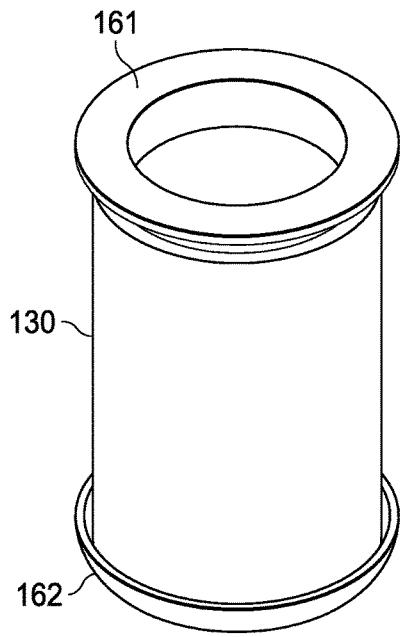
FIG. 8A shows a top perspective view of an exemplary seal that may be positioned about a second tubular body of a device for preventing the overflow of a fluid reservoir.
Figure 8B:
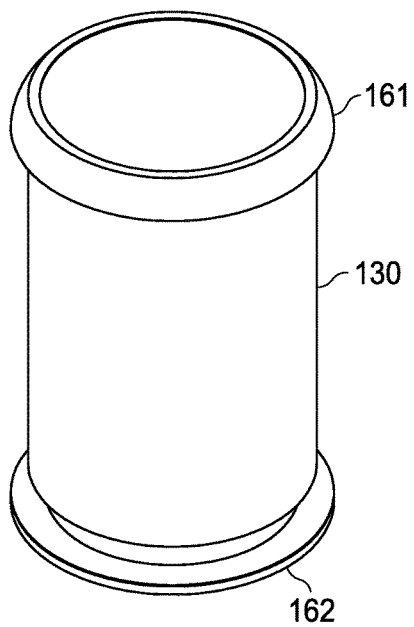
FIG. 8B shows a bottom perspective view of the exemplary seal as shown in FIG. 8A.
Figure 8C:
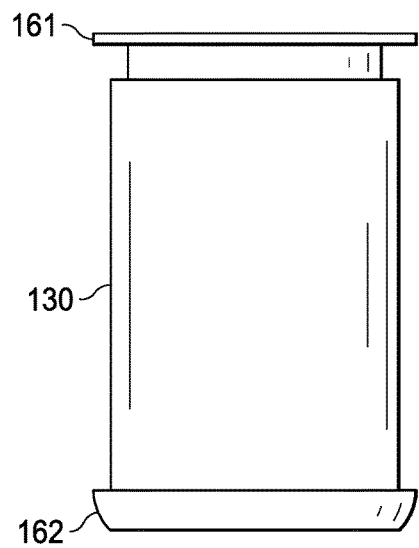
FIG. 8C shows a bottom perspective view of the exemplary seal as shown in FIG. 8A.
Figure 8D:
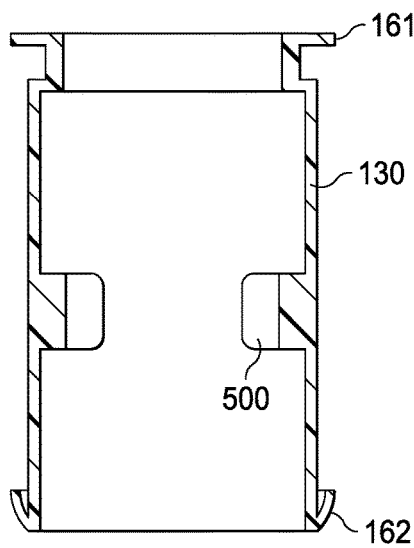
FIG. 8D shows a front section view of the exemplary seal as shown in FIG. 8A.

FIG. 7 illustrates an exemplary embodiment of a second tubular body 120 and air bell 140 that may be utilized by a device for preventing the overflow of a fluid reservoir 100. As shown in FIGS. 7A and 7C, the second tubular body 120 may define at least one opening 400 for receiving and maintaining part of a seal 130 permitting for the seal 130 to be held in a desired position at the first end of the second tubular body 120. FIG. 8, which illustrates an exemplary seal 130, shows in FIG. 8D that in such an exemplary embodiment, the seal 130 may comprise and preferably does comprise at least one catch 500 which is received by and snuggly fits into the opening 400 when the seal 130 is placed about the second tubular body 120. As shown in FIG. 7C, to maintain the buoyancy of the air bell 140 by decreasing its weight, the air bell may define a variety of openings however, and as will be obvious to one of ordinary skill in the art, the openings should be strategically placed such that they will not interfere with the intended purpose of the air bell 140 which is to float on the fluid within the reservoir.

Figure 12:
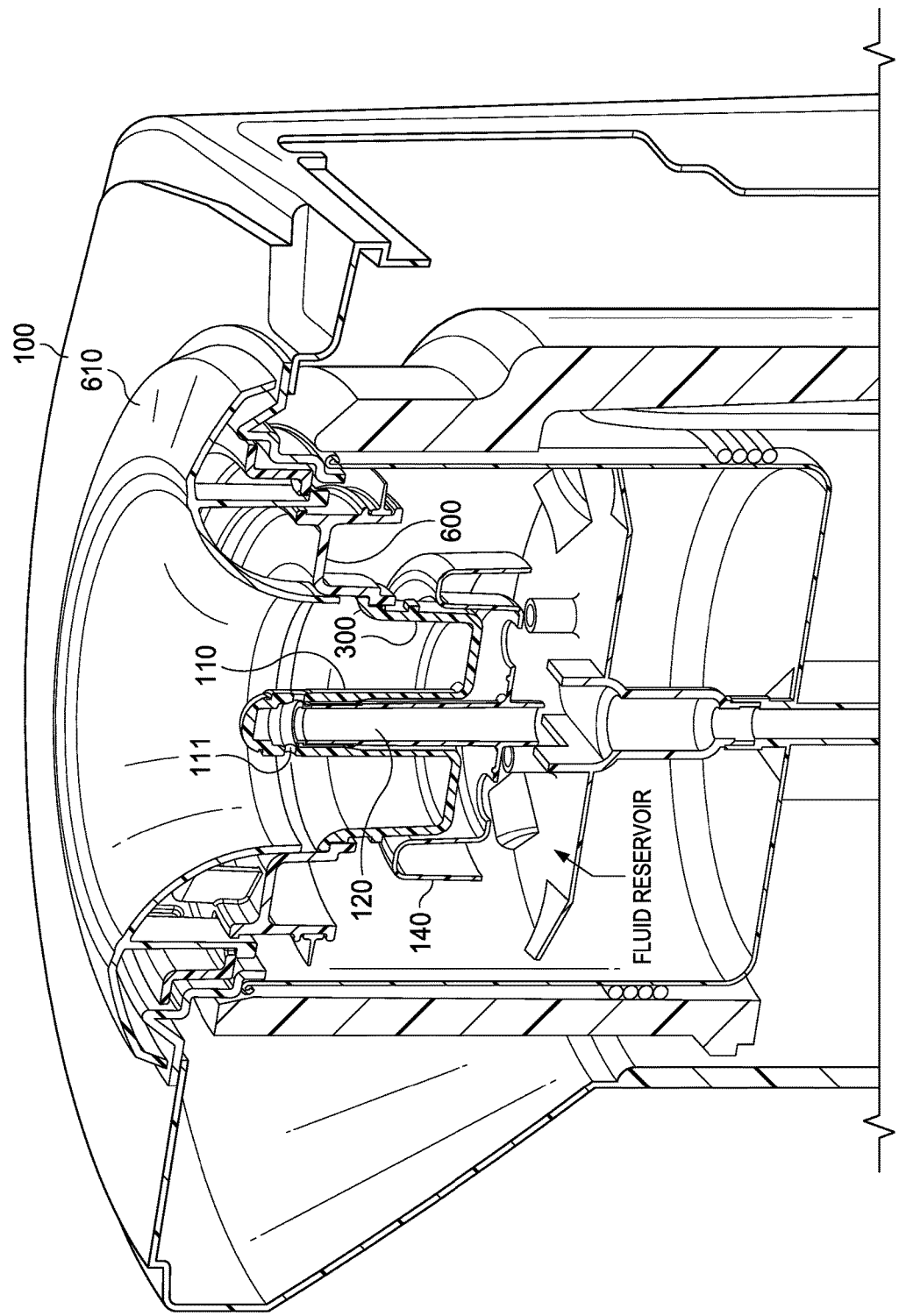
FIG. 12 shows a cross-section view of an exemplary device for preventing the overflow of a fluid reservoir shown connected to an exemplary water cooler and exemplary fluid reservoir.

FIG. 9 shows an exploded view of a second exemplary embodiment of a device 100 for preventing the overflow of a fluid reservoir wherein the device comprises a first tubular body 110, a probe cup 300, a second tubular body 120, a seal 130, and an air bell 140. This exemplary device additionally comprises a probe cup retainer 600 and a funnel 610. The funnel 610 serves the function of guiding the water bottle towards the desired position about the first tubular body 110 within the probe cup 300. The probe cup retainer 600 may be attached to the water cooler and provide a means to secure the probe cup 300. FIG. 12 provides a cross-section view of an exemplary device for preventing the overflow of a fluid reservoir which comprises a probe cup 300, a probe cup retainer 600, and a funnel 610 and illustrates how the probe cup retainer 600 may be utilized to secure the device 100 to a water cooler. In preferred exemplary embodiments, the first tubular body 110, second tubular body 120, seal 130, and air bell 140 are each made of polymeric material(s).

Figure 13:
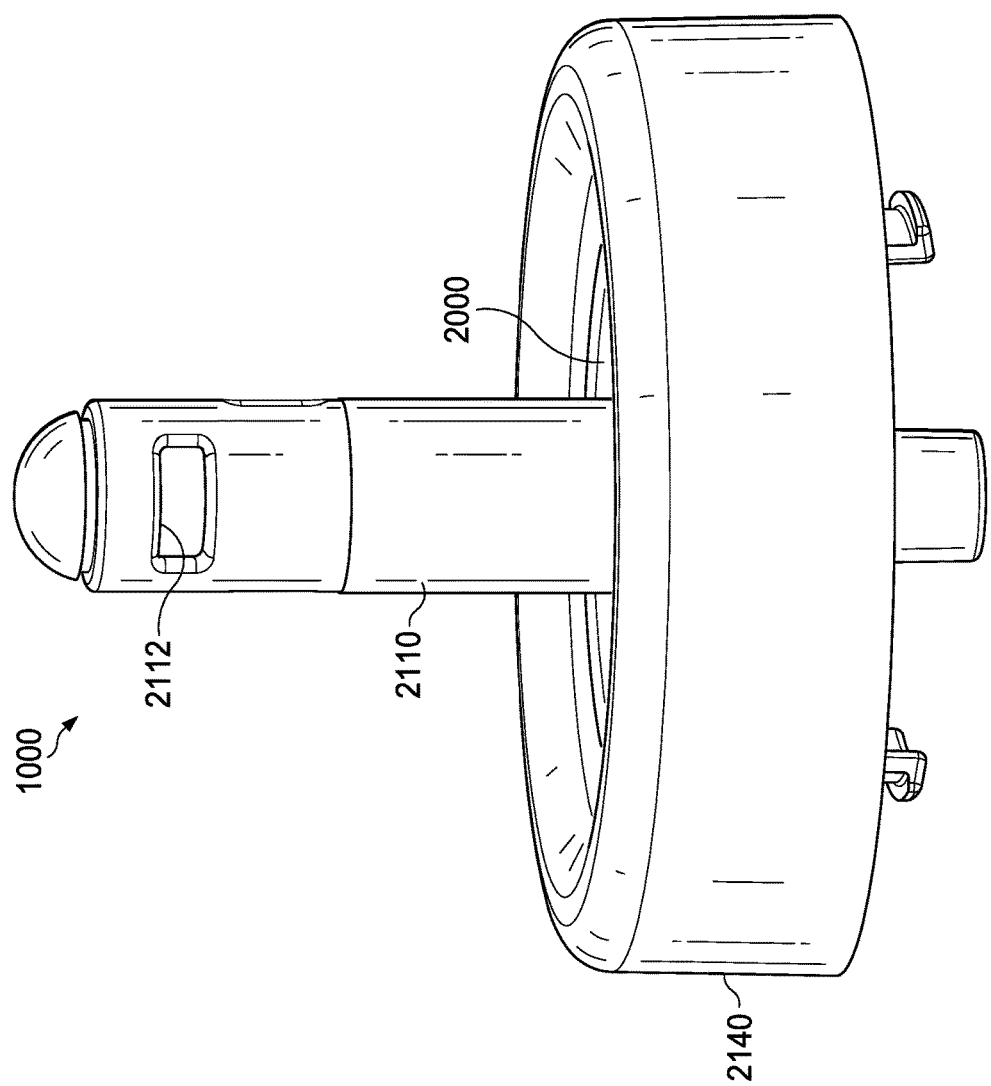
FIG. 13 shows a front perspective view of an exemplary device for preventing the overflow of a fluid reservoir comprising a probe cap which defines a first tubular body wherein said probe cap is capable of forming an air tight seal with a bottle.
Figure 14:
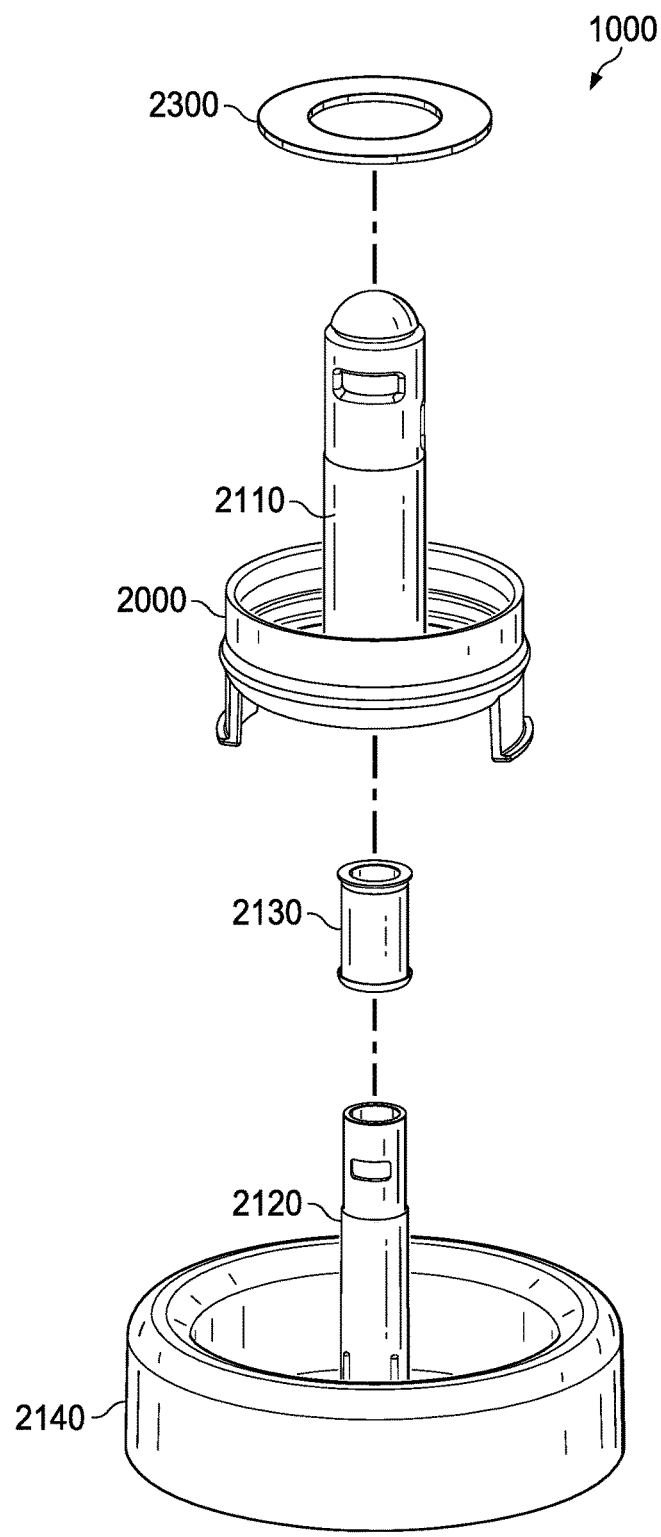
FIG. 14 shows an exploded perspective view of the exemplary device shown in FIG. 13.
Figure 16B:
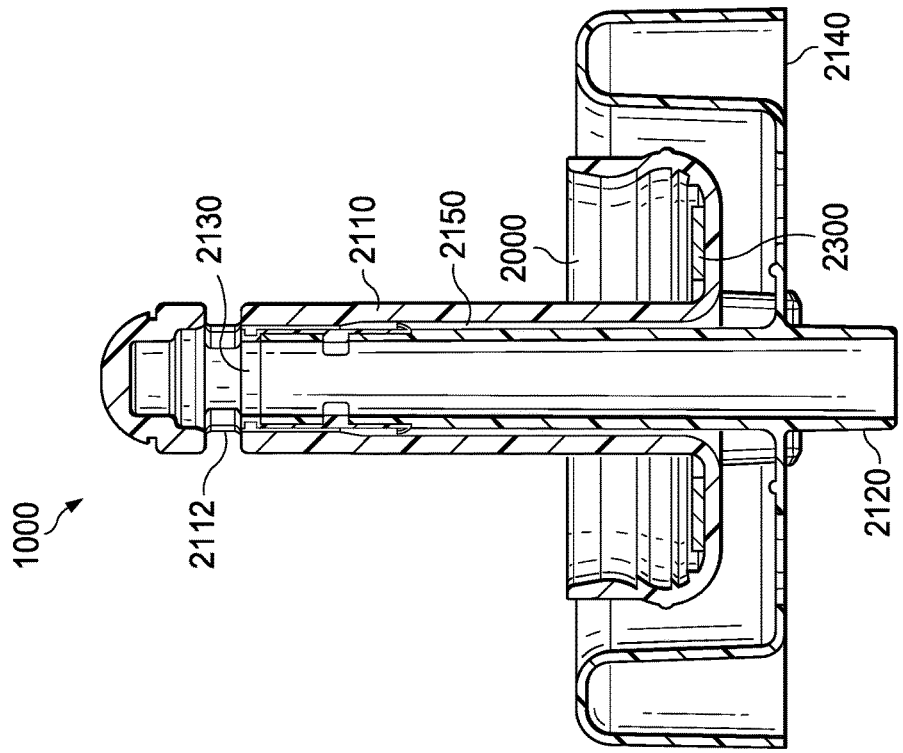
FIG. 16B shows a side section view of the exemplary device shown in FIG. 13 wherein the device is shown in an open position.
Figure 16A:
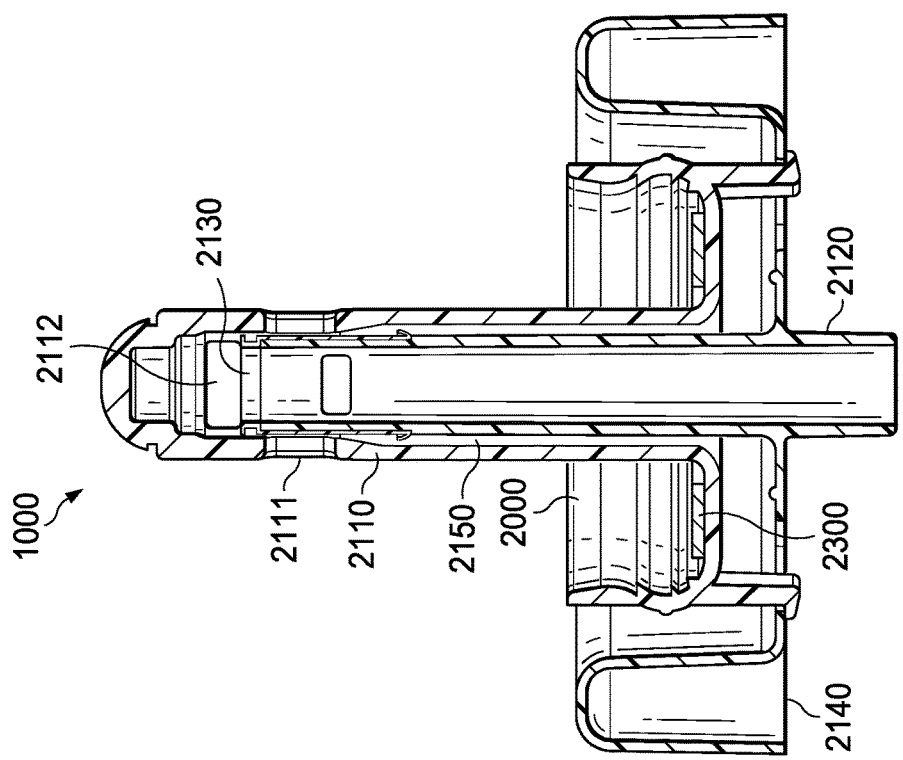
FIG. 16A shows a front section view of the exemplary device shown in FIG. 13 wherein the device is shown in an open position.

In some exemplary embodiments, it may not be necessary for a device for preventing the overflow of a fluid reservoir to be utilized in conjunction with a bottle comprising a cap. FIG. 13 shows an exemplary embodiment of a device 1000 that may be utilized in conjunction with a bottle that does not have a cap in order to prevent the overflow of a fluid reservoir. The device 1000 may comprise a probe cap 2000 that defines a first tubular body 2110. The first end of the first tubular body 2110 preferably defines a first opening 2111 for permitting a flow of air to exit the first tubular body 2110 and enter the container and further defines a second opening 2112 for permitting a flow of fluid to be received by the first tubular body 2110 from the container/bottle. As shown in FIG. 14, the first tubular body 2110 receives a second tubular body 2120. The second tubular body 2120 is movably disposed within the first tubular body 2110. At least part of the internal surface of the first tubular body 2110 and at least part of the external surface of the second tubular body 2120 define an air channel which permits for air to travel from the fluid reservoir into the bottle via opening 2111 under certain circumstances. As shown, the second tubular body 2120 is connected to a floatation device 2140 (in this embodiment an air bell) where said floatation device 2140 is adapted to come into contact with and float on top of water/fluid that has been received by the reservoir. Under normal circumstances, the device 1000 will remain in an open position meaning fluid may flow from the bottle, through opening 2112 and through the internal hollow of the second tubular body to the reservoir until the fluid in the reservoir reaches a height where it prevents air in the reservoir from gaining access to air channel 2150 thus creating a vacuum. No more fluid will flow through the open device 1000 until the fluid level in the reservoir falls and air within the reservoir may access the air channel 2150. FIG. 16 shows an exemplary open position of the device 1000 wherein FIG. 16A is a front section view of the device 1000 and FIG. 16B is a side section view of the device 1000.

Figure 15B:
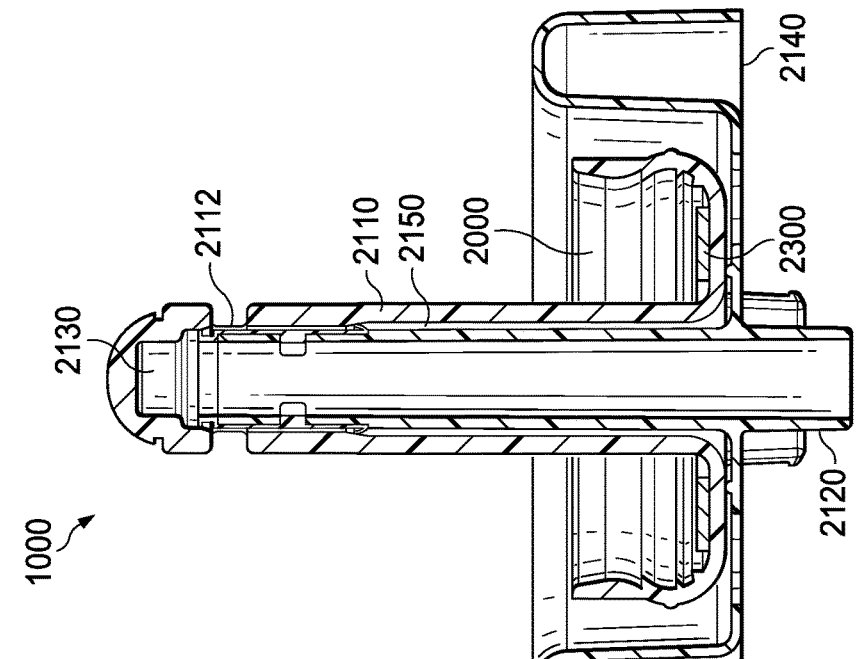
FIG. 15B shows a side section view of the exemplary device shown in FIG. 13 wherein the device is shown in a closed position.
Figure 15A:
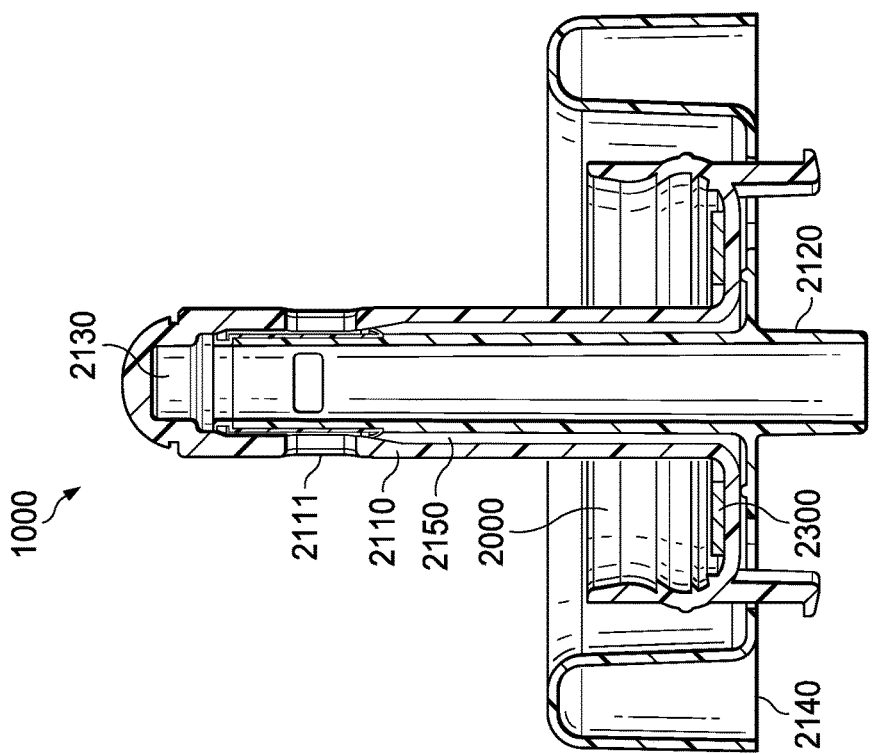
FIG. 15A shows a front section view of the exemplary device shown in FIG. 13 wherein the device is shown in a closed position.

Under abnormal circumstances however, such as when there is a crack in the bottle, even when the fluid in the reservoir reaches a height where it prevents air in the reservoir from gaining access to the air channel 2150 fluid may continue to flow through the device 1000 to the reservoir because the cracked bottle destroys the vacuum. When this occurs and the fluid in the reservoir rises above a critical level, floatation device 2140 will preferably rise with the rising fluid causing a corresponding movement of the second tubular body 2120 within the first tubular body 2110. When the second tubular body 2120 reaches a maximum height within the first tubular body 2110 at least part of the external surface of the second tubular body 2120 engages with at least part of the internal surface of the first tubular body 2110 to close the air channel 2150 and to close opening 2112 such that no additional fluid may gain access to the reservoir via the hollow of the second tubular body 2120 or the air channel 2150. As shown, the engagement of at least part of the external surface of the second tubular body and at least part of the internal surface of the first tubular body may occur via a seal 2130 that is positioned about or part of the second tubular body and that is adapted to close the air channel 2150 such that it may not be utilized as a water/fluid passageway for fluid to travel from the bottle to the reservoir when the water in the reservoir has risen above a critical level. The seal 2130 also simultaneously closes off opening 2112 in the sense that water/fluid entering that opening cannot gain access to the internal passageway of the second tubular body 2120 and cannot therefore travel to the reservoir. FIG. 15 illustrates an exemplary closed position of device 1000 wherein the device 1000 comprises a seal 2130 which assists in closing off the air channel 2150 as well as in closing off opening 2112. In some exemplary embodiments, the seal 2130 may comprise an upper lip and a lower lip as was discussed in conjunction with seal 130 wherein the lips assist in sealing to at least part of the internal surface of the first tubular body 2110. FIG. 15A shows a front section view of the device while FIG. 15B shows a side section view of the device. The view shown in FIG. 15B shows how the seal 2130 may work in conjunction with at least part of the internal surface of the first tubular body 2110 to close off opening 2112 so that no fluid entering the opening 2112 may gain access to the hollow defined by the interior surface of the second tubular body 2120 preventing the fluid from traveling to the reservoir when the second tubular body 2120 has risen to a maximum height within the first tubular body 2110.

Figure 17:
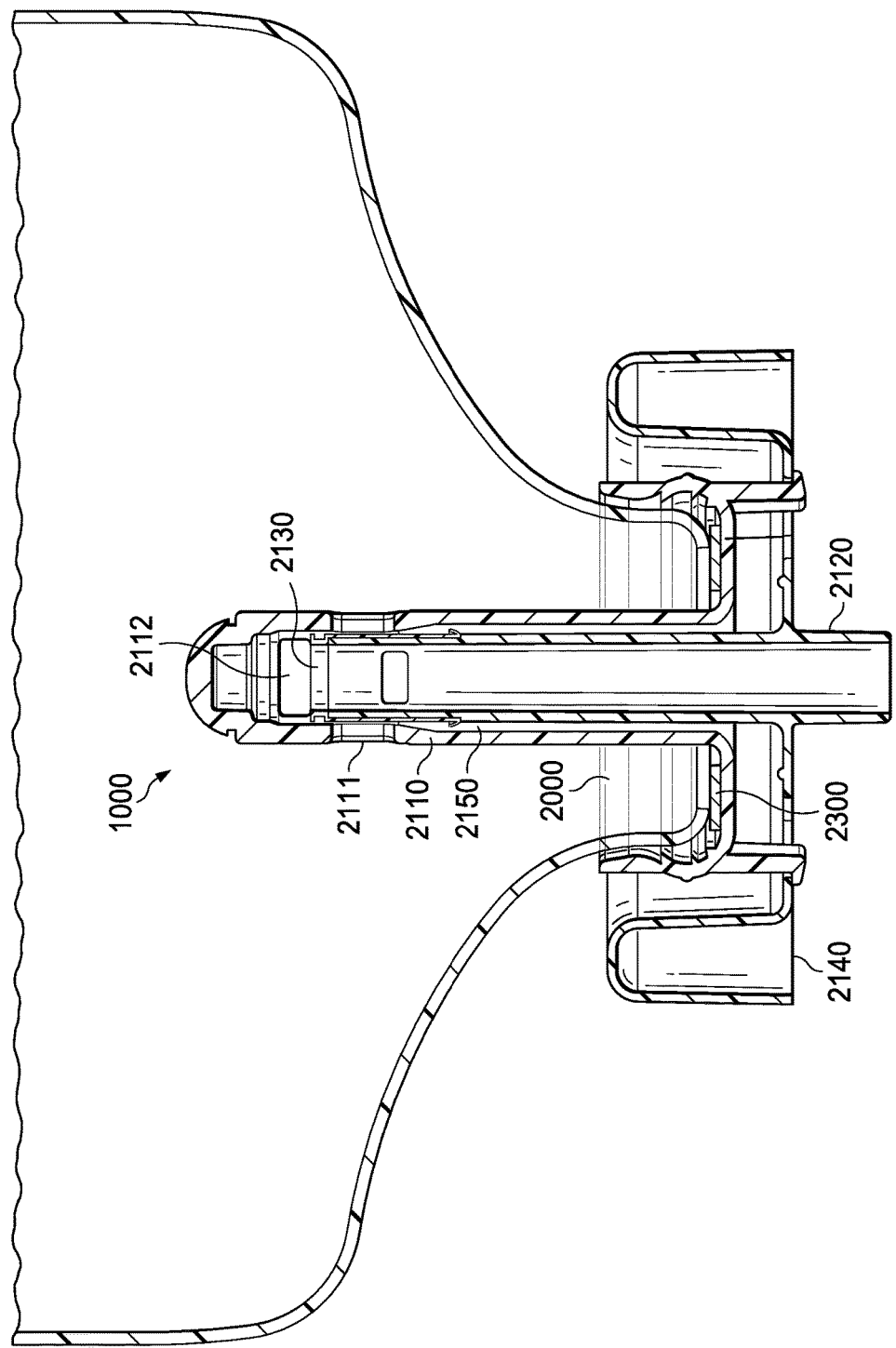
FIG. 17 shows a front section view of the exemplary device shown in FIG. 13 shown connected to an exemplary bottle which may selectively hold a fluid.

An exemplary embodiment of a device 1000 that may be utilized in conjunction with a bottle that does not have a cap in order to prevent the overflow of a fluid reservoir may additionally comprise a gasket 2300 which is positioned about the first tubular body 2110 and which assists in receiving a bottle and with the formation of an air tight seal between the probe cap 2000 and bottle. FIG. 14 illustrates an exemplary gasket which may be utilized in conjunction with the device 1000. FIG. 17 illustrates how the exemplary device 1000 may be connected to a bottle. Details pertaining to the cooler and fluid reservoir have not been shown in FIG. 14.

While it is contemplated that the device disclosed herein will be predominately used in water cooler applications and therefore water coolers have been discussed extensively, the device may also be utilized in conjunction with devices that are used to maintain liquids other than water. Further, it is possible that the device could be useful in any system that is reliant upon a vacuum to ensure the proper supply of a liquid from a first retaining body to a second retaining body. It is not necessary that the system be a cooler for water or another beverage.

Any embodiment of the disclosed system and method may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A device for preventing the overflow of a fluid reservoir comprising:
  a first tubular body comprising an interior and an exterior surface said interior surface defining a hollow within the first tubular body, said first tubular body further comprising a first end and a second end wherein the first end of the first tubular body defines a first hole extending from the interior surface to the exterior surface of the first tubular body said first hole permitting for the passage of an air flow to exit the first tubular body and a second hole extending from the interior surface to the exterior surface of the first tubular body said second hole permitting the first tubular body to receive of a flow of fluid;

a second tubular body comprising an interior and an exterior surface said interior surface defining a hollow within the second tubular body, said second tubular body further comprising a first end and a second end wherein the first end of the second tubular body is received by the first tubular body and movably disposed therein and the second end of the second tubular body may be disposed within the fluid reservoir such that the hollow defined by the interior surface of the second tubular body may receive the flow of fluid after it is received by the second hole of the first tubular body and may direct the fluid flow to the fluid reservoir wherein at least part of the exterior surface of the second tubular body and at least part of the interior surface of the first tubular body define an air channel such that the air channel may direct a flow of air from the fluid reservoir to the first hole defined by the first tubular body where it may exit the first tubular body; and a floatation device connected to the second end of the second tubular body said floatation device adapted to float on top of fluid within the fluid reservoir and cause movement of the second tubular body within the first tubular body closing the air channel such that water is prevented from entering the air channel and traveling to the reservoir when the second tubular body has reached a maximum height within the first tubular body.

2. The device of claim 1 wherein the floatation device comprises an air bell.

3. The device of claim 1 further comprising a seal connected to the first end of the second tubular body said seal adapted to engage with part of the interior surface of the first tubular body thereby closing off the air channel when the second tubular body has reached a maximum height in the first tubular body.

4. The device of claim 3 wherein the seal comprises a lip that engages with part of the interior surface of the first tubular body when the second tubular body has reached a maximum height in the first tubular body and the engagement of the lip with the interior surface of the first tubular body closes off the air channel.

5. The device of claim 1 wherein the exterior surface of the first tubular body further comprises a probe cup that is adapted to receive and help hold a container of fluid in a desired position about the first tubular body.

6. The device of claim 5 wherein the probe cup is positioned at the second end of the first tubular body.

7. The device of claim 3 wherein the seal comprises an upper lip and a lower lip wherein said upper lip engages with at least part of the interior surface of the first tubular body to effectively close off the first hole of the first tubular body such that water entering the first hole may not gain access to the hollow defined by the interior surface of the second tubular body and said lower lip engages with at least part of the interior surface of the first tubular body to close off the air channel when the second tubular body reaches a maximum height in the first tubular body.

8. The device of claim 1 wherein the floatation device comprises an inner tube that maintains a volume of air and which is capable of floating on top of fluid within the fluid reservoir.

9. A device for preventing the overflow of a fluid reservoir comprising:

a first tubular body comprising a first end and a second end and further comprising an interior and an exterior surface said first tubular body defining a first hole for admitting a flow of fluid into the first tubular body and further defining a second hole for permitting a flow of air to escape the first tubular body;

a second tubular body comprising an interior and an exterior surface and further comprising a first end and a second end wherein the first end of the second tubular body is received by the first tubular body and movably disposed therein and the second end of the second tubular body may be disposed within the fluid reservoir such that a fluid passageway defined by the interior surface of the second tubular body may receive the flow of fluid after it is received by the second hole of the first tubular body and may direct the fluid flow to the fluid reservoir wherein at least part of the exterior surface of the second tubular body and at least part of the interior surface of the first tubular body define an air channel such that the air channel may direct a flow of air from the fluid reservoir to the first hole defined by the first tubular body where it may exit the first tubular body;

a seal positioned about the exterior surface of the first end of the second tubular body said seal comprising a lip which extends away from the second tubular body and towards the interior surface of the first tubular body; and a floatation device connected to the second end of the second tubular body said floatation device adapted to float upon and move with rising fluid in the fluid reservoir causing movement of the second tubular body within the first tubular body such that the air channel becomes closed by engagement of the lip with at least part of the interior surface of the first tubular body when the second tubular body has reached a maximum height in the first tubular body.

10. The device of claim 9 wherein said seal further comprises a second lip which extends away from the second tubular body and towards the interior surface of the first tubular body.

11. The device of claim 10 wherein the first hole of the first tubular body comprises an upper edge and a lower edge and wherein at least one of the lips is in slide-able contact with the interior surface of the first tubular body above the first hole's upper edge.

12. The device of claim 11 further comprising an arm connected to the floatation device which limits movement of the floatation device away from the first tubular body.

13. The device of claim 9 further comprising a probe cup connected to the exterior surface of the first tubular body.

14. A device for preventing the overflow of a fluid reservoir comprising:

a first tubular body comprising a first end and a second end and further comprising an interior and an exterior surface said first tubular body defining a first hole for admitting a flow of fluid into the first tubular body and further defining a second hole for permitting a flow of air to escape the first tubular body;

a second tubular body comprising an interior and an exterior surface and further comprising a first end and a second end wherein the first end of the second tubular body is received by the first tubular body and movably disposed therein and the second end of the second tubular body may be disposed within the fluid reservoir such that a hollow defined by the interior surface of the second tubular body may receive the flow of fluid after it is received by the second hole of the first tubular body and may direct the fluid flow to the fluid reservoir wherein at least part of the exterior surface of the second tubular body and at least part of the interior surface of the first tubular body define an air channel such that the air channel may direct a flow of air from the fluid reservoir to the first hole defined by the first tubular body where the air may exit the first tubular body;

a step positioned on the interior surface of the first tubular body; and a floatation device connected to the second end of the second tubular body said floatation device adapted to float upon and move with rising fluid in the fluid reservoir causing movement of the second tubular body within the first tubular body such that the air channel becomes closed by engagement of at least part of the exterior surface of the second tubular body with the step when the second tubular body reaches its maximum height within the first tubular body.

15. The device of claim 14 further comprising a seal connected to the first end of the second tubular body and disposed about the external surface of the tubular body wherein the engagement of at least part of the external surface of the second tubular body with the step occurs via the seal.

16. The device of claim 14 wherein said floatation device comprises an air bell.

17. The device of claim 14 further comprising a probe cup connected to the exterior surface of the first tubular body.

18. The device of claim 14 wherein the first tubular body and the second tubular body are made of polymeric material.

19. The device of claim 15 wherein the seal comprises a lip.

20. The device of claim 19 wherein the device further comprises a second lip.

* * * * *